United States Patent [19]

Ketterer

[11] 3,804,704

[45] Apr. 16, 1974

[54] MICA PAPER LAMINATES

[75] Inventor: Richard J. Ketterer, Burnt Hills, N.Y.

[73] Assignee: General Electric Company, Schenectady, N.Y.

[22] Filed: Dec. 27, 1971

[21] Appl. No.: 212,645

[52] U.S. Cl............... 161/206, 161/163, 161/171, 117/100 S, 117/123 D, 260/865
[51] Int. Cl............................................. B32b 13/04
[58] Field of Search.................... 161/171, 206, 163; 117/123 A, 123 D, 123 R, 125; 106/291; 423/324, 325

[56] References Cited
UNITED STATES PATENTS

| 2,949,150 | 8/1960 | Traynor | 154/2.6 |
| 3,655,565 | 4/1972 | McDonald | 252/63.2 |
| 3,183,115 | 5/1965 | Ketterer | 117/65.2 |
| 3,332,817 | 7/1967 | Obenhaus | 156/313 |
| 2,493,693 | 1/1950 | Parkinson | 154/2.6 |
| 2,914,426 | 11/1959 | Gaines | 117/118 |
| 3,650,790 | 3/1972 | Klenke et al. | 106/291 |
| 3,226,286 | 12/1965 | Scheuer | 161/171 |
| 3,618,753 | 11/1971 | Glasspoole | 206/59 |

OTHER PUBLICATIONS

Union Carbide Information Bulletin "Union Carbide Y–5712 Silyl Peroxide Adhesion Promotor" November, 1971, (F42558C) TP 968 U5.

Primary Examiner—George F. Lesmes
Assistant Examiner—William R. Dixon, Jr.

[57] ABSTRACT

The addition of silyl peroxide to mica paper laminates substantially raises their water resistance, increasing their usefulness under conditions where water is present.

3 Claims, No Drawings

MICA PAPER LAMINATES

This invention relates to mica paper laminates. More particularly, it relates to such materials which are characterized by substantially enhanced resistance to water, thus increasing their usefulness where water is present.

Mica paper, or reconstituted mica as it is sometimes called, is well known and can be prepared in any of a number of ways. According to U.S. Pat. No. 2,549,880, mica is dehydrated at an elevated temperature of the order of about 800°C, placed in a liquid medium, and broken up to form a pulp which is then laid down by paper making techniques. According to U.S. Pat. No. 2,405,576, mica suitable for preparing paper can be obtained by breaking mica into fine platelets under the action of liquid jets. In still another process described in U.S. Pat. No. 3,110,299, mica is delaminated for paper making purposes by peeling therefrom successive layers of materials. Mica paper is quite weak and in practical use it is impregnated with a suitable resin or other binder and laid up into laminates of desired thickness which are then cured or hardened in a manner suitable to the binder used. Such mica paper laminates have found many uses including utilization as circuit boards, arc chute materials, slot liners, slot wedges, commutator retaining rings, segment plates, tapes, radar domes, and other uses where the electrical insulating capability and high temperature or arc resistance of the micaceous material is indicated. Despite such usefulness of mica paper laminates, it has been found that where they are used in the presence of water, there is a tendency toward absorption of water which detracts from the electrical insulating qualities of the laminates and tends to weaken them physically. It is accordingly a primary object of the present invention to provide mica paper laminates which are characterized by unexpectedly increased resistance to water.

Briefly, according to the present invention, the mica paper or the impregnating resin is treated with from about 0.1 percent by weight to 10 percent by weight, preferably 0.5 percent by weight of silyl peroxide. The sheets so prepared are laminated under heat and pressure to provide laminates which not only have an unexpected resistance to water absorption but actually have an enhanced physical strength.

Those features of the invention which are believed to be novel are set forth with particularity in the claims appended hereto. The invention will, however, be better understood and further objects and advantages appreciated from a consideration of the following description.

The following examples will illustrate the practice of the present invention, it being realized that they are to be taken as exemplary only and not limiting in any way. All parts and percentages are by weight unless otherwise indicated.

EXAMPLE 1

Mica paper 4 mils thick was painted with 0.5 percent of its weight of silyl peroxide (Union Carbide Y-5712) as a 0.5 percent solution in toluol, air dried and then impregnated with a 15 percent solution of polystyrene (Shell 300) in xylol. The sheets so formed were dried at 90°C to touch and were laminated into a four-ply structure at 350°F and 500 psi. At the same time, a similar laminate or structure was formed omitting the treatment with silyl peroxide. All of the laminates were immersed in water for 24 hours and the water pick-up determined. The silyl peroxide treated laminate having a binder content of 21 percent had absorbed 0.8 percent of its weight in water in 24 hours and had an average flexural strength of 34,000 psi. On the other hand, the laminate which was not treated with silyl peroxide and which had a binder content of 20 percent absorbed 150.9 percent of its weight in water in 24 hours and had a flexural strength of only 24,330 psi.

The following examples further illustrate the unexpectedly low water absorption or take-up of the present materials. Mica paper was treated with silyl peroxide as in Example 1 above and then impregnated with various resins and cured under heat and pressure. The resins used were 2-ethyl hexyl acrylate monomer containing 5 percent ethylene glycol maleate unsaturated alkyd resin (Monomer A) along with 1.5 percent t-butyl perbenzoate as a curing catalyst. Other suitable curing catalysts are described in the literature, for example, U.S. Pat. No. 3,334,063. Monomer B consisted of Monomer A with the addition of 5 percent by weight acrylic rubber, specifically Goodrich Hycar 4021. Monomer C consisted of Monomer B with the addition of 10 percent alphamethyl polystyrene (Dow 276-V9). The mica paper impregnated with the resin indicated was laid up into a four-ply structure and press cured at 100 psi for one-half hour at 220°F, for one-half hour at 250°F, and then for one-half hour at 300°F. The laminates were then immersed in water for 24 hours along with laminates made in a similar manner, with the exception of the silyl peroxide treatment.

Shown in the table below is the water absorption of the various laminates after 24 hours, it being quite apparent that the present silyl peroxide treatment far and away enhances the water resistance of the mica paper laminates.

TABLE

| Example | Monomer | Treatment | Binder Content | Water absorbed in 24 hours |
|---------|---------|-----------|----------------|----------------------------|
| 2 | A | None | 13.3% | 108.7% |
|   |   | Silyl peroxide | 12.1% | 3.5% |
| 3 | B | None | 24.6% | 74.3% |
|   |   | Silyl peroxide | 24.6% | 2.2% |
| 4 | C | None | 20.4% | 114.6% |
|   |   | Silyl peroxide | 22.2% | 1.6% |

EXAMPLE 5

Example 2 was repeated except that instead of painting the silyl peroxide on the mica paper, it was included in the amount of 0.5 percent by weight of the laminate dissolved in the catalyzed Monomer A. Four plies of the mica paper were laid up into a laminate and cured at 50 psi for one-half hour at 220°F, one-half hour at 250°F, and one-half hour at 300°F. The mica paper laminate so prepared containing 15.4 percent of binder, along with a similar laminate except for the omission of silyl peroxide and containing 15.6 percent binder, was immersed in water for 24 hours. After the 24-hour water treatment, the laminate with the silyl peroxide treated resin impregnant had absorbed only 1.6 percent of water whereas the laminate having no silyl peroxide resin treatment had absorbed 115.3 percent of water.

EXAMPLE 6

This example illustrates the specificity of the present invention as compared, for example, to a well known water repellent silicone resin, specifically General Electric SR–231 resin. Mica paper as in Example 5 was treated with a resinous material consisting of 100 parts Monomer A, two parts t-butyl perbenzoate as a curing catalyst, and 0.5 percent silicone resin (SR–231). The mica paper was laid up into a four-ply laminate and cured under heat and pressure. The laminate so prepared along with a similarly prepared laminate except for the absence of silicone resin was immersed in water for 24 hours. After that period, the silicone resin treated laminate having a binder content of 18.5 percent had absorbed 112.3 percent of its weight in water and the laminate having no silicone treatment had absorbed 118.4 percent of water.

There are provided, then, by the present invention mica paper laminates which are particularly characterized by unexpectedly increased resistance to water absorption and by enhanced physical strength. The laminates so prepared are particularly useful as insulating tapes and can be used for any application where the electrical insulating, arc resistance and high temperature resistant characteristics of the micaceous materials are indicated. Among such uses, in addition to insulating tapes, are segment plates, commutator retaining rings, slot wedges, slot liners, arc chutes and the like.

What I claim as new and desire to secure by Letters Patent of the United States is:

1. A heat and pressure cured resin-impregnated laminate having a plurality of mica paper sheets, said laminate containing from about 0.1 to 10 percent, based on the mica paper weight, of silyl peroxide, said laminate being characterized by improved moisture resistance.

2. Mica paper laminate as in claim 1 wherein said silyl peroxide is applied to the mica paper before resin treatment.

3. Mica paper laminate as in claim 1 in which the silyl peroxide is included in the resin impregnant.

* * * * *